Jan. 7, 1936. G. A. PETROE 2,026,704
VALVE
Filed July 24, 1934
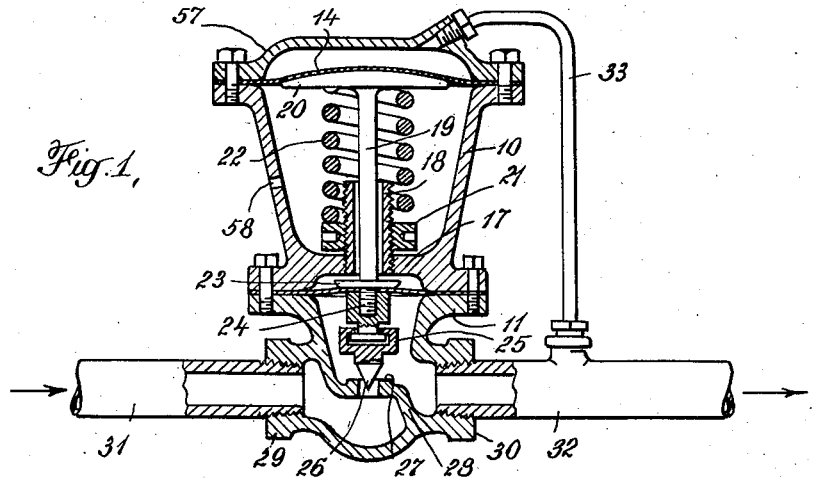
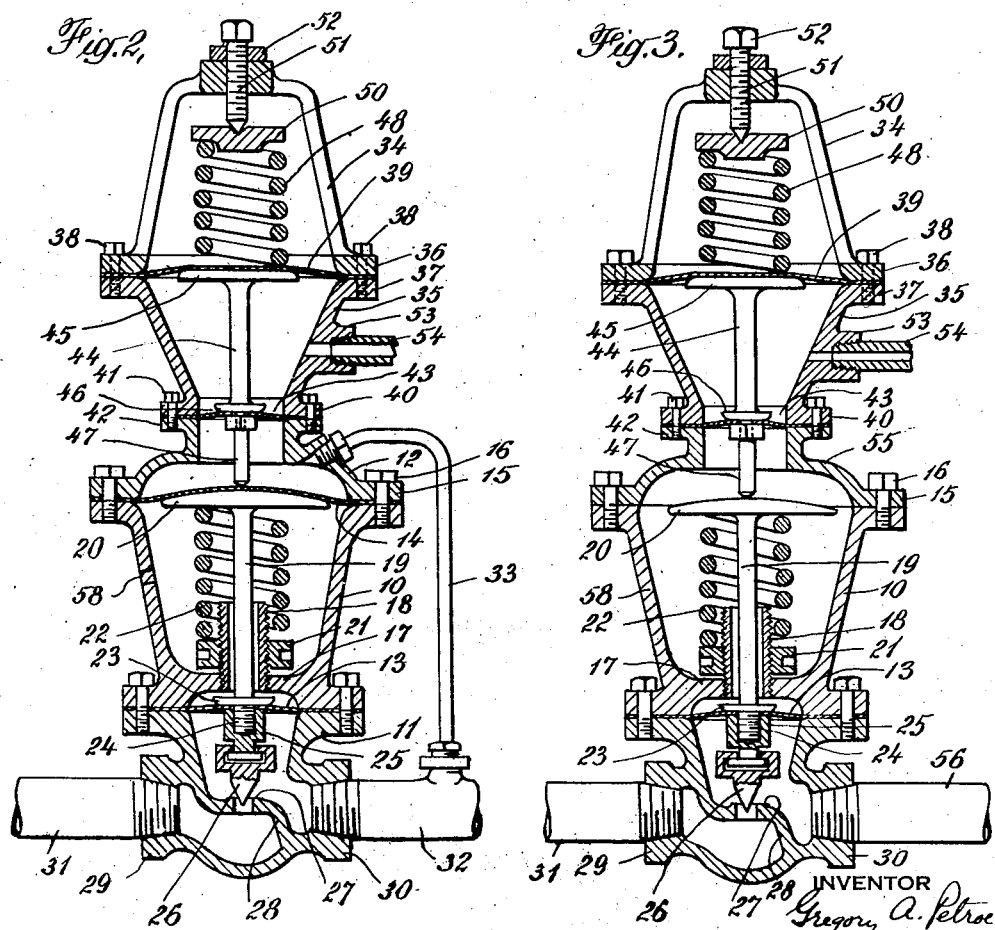
INVENTOR
Gregory A. Petroe
ATTORNEYS Patented Jan. 7, 1936

2,026,704

UNITED STATES PATENT OFFICE 2,026,704

VALVE

Gregory A. Petroe, Niagara Falls, N. Y., assignor to The Mathieson Alkali Works, Inc., New York, N. Y., a corporation of Virginia Application July 24, 1934, Serial No. 736,704

9 Claims. (Cl. 50—12)

This invention relates to valves and is concerned more particularly with a new motor controlled valve assembly, the motor device of the assembly being actuated by fluid and permitting control of the valve to be exercised at a point remote from the assembly. The valve of the assembly may be of the pressure reducing type functioning automatically, when brought into action by the motor device, to allow the passage of fluid through it at a selected pressure from a source of supply at a higher pressure, or the valve may be a stop valve which opens to a selected extent when brought into action by the device and remains in open position until closed by the device. Whichever form of valve is used, the new assembly offers various advantages over the prior constructions which will be made clear in the detailed description to follow.

The motor device and the pressure reducing valve of the assembly are both of novel construction and both involve the use of a pair of diaphragms of different sizes. Upon the application of pressure to the two diaphragms of the motor, the latter is caused to function by the force which acts because of the differences in the diaphragm areas, and similarly the pressure-reducing valve when functioning automatically is actuated by the difference in the total pressures acting on the diaphragms. The stop valve includes a single diaphragm, and in all cases the use of the diaphragms simplifies the construction, avoids the necessity of employing packing, and reduces the number of wearing parts. Also, by the use of the new motor, the valves may be made with smaller diameter seats than would otherwise be possible.

The new pressure reducing valve can be used alone, in which event it functions entirely automatically, and the invention, therefore, comprehends the new motor-controlled valve assembly including either a pressure reducing valve or a stop valve, and also the pressure reducing valve of novel construction.

For a better understanding of the invention, reference may be had to the accompanying drawing, in which Figure 1 is a sectional view of the pressure reducing valve;

Figure 2 is a sectional view of the new assembly showing the motor employed for controlling the pressure reducing valve; and Figure 3 is a view similar to Figure 2 but showing the motor operating a stop valve.

In the drawing, the pressure reducing valve is illustrated as including a housing made up of a body member 10, a bottom member 11, and a top member 12. A diaphragm 13 is interposed between the body and the bottom member and a diaphragm 14 is interposed between the body and the top member. The body and the top and bottom members are all provided with circumferential flanges 15 secured together by bolts 16, and the edges of the diaphragms are clamped between the flanges on two adjacent members and held securely in position. Within the body is a shoulder 17 into which is threaded a bushing 18 through which loosely passes a stem 19 terminating in an enlarged head 20 lying in contact with the diaphragm 14. A collar 21 is threaded on the bushing and forms an adjustable seat for a spring 22 which bears at one end against the collar and at the other end against the under surface of the head 20, the collar being adjustable along the bushing to vary the compression of the spring.

The stem 19 projects through the bushing and has a collar 23 which lies in contact with the diaphragm 13, and a portion 24 of the stem extends through the diaphragm and has threaded thereon a member 25 on which the valve 26 is loosely hung. The free end of the valve 26 is conical and it cooperates with a seat 27 formed in a partition 28 in the bottom member 11. The bottom member has bosses 29 and 30 at opposite sides of the partition into which can be threaded pipes 31 and 32, the pipe 31 leading from a source of fluid under relatively high pressure and the pipe 32 leading away the fluid at a reduced pressure. A pipe 33 leads from the pipe 32 to an opening in the wall of the member 12 above the diaphragm 14, the end of the pipe 33 being secured in the opening by suitable means.

The motor device comprises a top member or cage 34 and a bottom member 35 having circumferential flanges 36 and 37 secured together by bolts 38. A diaphragm 39 is interposed between the members 34 and 35 and its edges are clamped between the flanges 36 and 37. The housing member 35 is open at its lower end and it is provided with a circumferential flange 40 which is secured by bolts 41 to a similar flange 42 at the top of the member 12 of the valve, a diaphragm 43 being interposed between the members 12 and 35 with its edges clamped between the flanges 40, 42.

Within the housing member 35 of the motor device is a stem 44 having an enlarged head 45 lying in contact with the under surface of diaphragm 39. The stem also has a collar 46 lying in contact with the diaphragm 43, and a portion of the stem passes through the diaphragm and has threaded thereon an end piece 47 which is engageable with the diaphragm 14 in the valve.

Mounted within the housing member 34 of the motor is a spring 48 bearing at one end against the diaphragm 39 and at the other against a block 50 which lies in contact with the lower end of a bolt 51 threaded in an opening in the top of the member 34 and held in adjusted position by a lock nut 52. The bolt makes it possible to alter the position of the block 50 and thus vary the compression of the spring 48. The member 35 of the motor has a hollow boss 53 into which can be threaded a pipe 54 leading from a source of fluid under pressure.

The diaphragm 39 of the motor is substantially larger in area than diaphragm 43, and similarly the exposed area of diaphragm 14 of the motor is substantially greater than the exposed area of diaphragm 13. When the device is not in operation, the pressure in the chamber in the motor between diaphragms 39 and 43 is substantially atmospheric, and under these conditions, the spring 48 forces the diaphragm 39 downward and this results in the stem 44 lying at the lower end of its path of travel. The end piece 47 on the stem bears against the diaphragm 14, and since spring 48 is stronger than spring 42, the stem 44 forces down stem 19, causing valve 26 to contact with its seat 27 and thereby shut off the flow of fluid through the valve. Whenever it is desired to permit fluid to pass through the valve, fluid under pressure is admitted through the pipe 54 to the interior of the housing member 35 of the motor. This fluid acts on both diaphragms 39 and 40, but since the diaphragm 39 is of larger area, the fluid causes that diaphragm to rise, compressing spring 48. As the end piece 47 moves upward, the spring 22 of the valve acts on the head 20 to raise the stem 19 and thus free the valve from its seat. During the functioning of the valve, pressure is maintained in the motor between the two diaphragms and the diaphragms remain in their upward position in which the end piece 47 offers no obstruction to the upward movement of the diaphragm 14.

Fluid under the relatively high pressure now enters the bottom member 11 through the pipe 31 and passes through the valve and away through the pipe 32. Should the pressure in the pipe 32 exceed that for which the valve is set, a portion of the fluid entering the top member 12 through the pipe 33 causes diaphragm 14 to move down to close valve 26. Both diaphragms 13 and 14 are exposed to the pressure of this portion of the fluid but since diaphragm 14 is larger in area than diaphragm 13, the pressure is effective to cause diaphragm 14 to seat the valve. As the pressure in the pipe 32 and in the top member 12 falls upon the shutting of valve 26, a point is reached at which the spring 22 can overcome the force opposing it and raise the valve 26 to permit further passage of fluid through the device.

When it is desired to stop the operation of the valve, pressure is allowed to escape from the housing member 35 of the motor, whereupon the spring 48 functions to move stem 44 downward and close the valve 26.

In the new motor-controlled valve assembly, the use of the diaphragms makes it unnecessary to employ packing, and since the valve 26 lies above its seat and the stem does not pass through the opening in partition 28, this opening may be of small diameter. The adjustments of the compression of the springs 22 and 48 permit the device to be regulated for different conditions of operation as may be desired.

In the assembly, the valve used may be of the stop type, and this combination is illustrated in Figure 3. In this construction, there is no diaphragm interposed between the top member 55 of the body member 10 of the housing of the valve, and there is no connection between the interior of the top member 55 and the discharge pipe 56. The spring 22, therefore, maintains the valve 26 separated from the seat 27, whenever it it is permitted to do so by the motor device, and the position of the valve is not affected by the pressure in the pipe 56. The introduction of a fluid under pressure between the diaphragms 39 and 43 of the motor device results in the stem 44 being raised so that the spring 22 is effective to raise the valve from its seat. Whenever the pressure in the chamber between diaphragms 39 and 43 of the valve is substantially atmospheric, the spring 48 moves the stem 44 down and this causes the valve 26 to close.

As previously explained, the pressure reducing valve of the assembly may be used alone, in which case its operation is entirely automatic. The valve when used in this manner has the form shown in Figure 1. It differs from the valve illustrated in Figure 2 only in that the top member 57 is closed and not adapted to have the motor device mounted thereon. With this construction, the valve 26 normally lies clear of its seat 27, but upon the building up of a pressure in the pipe 32 in excess of that desired, a portion of the fluid flowing through the pipe 33 into the top member 57 above the diaphragm 14 causes the diaphragm to move down, forcing valve 26 against its seat. The pressure for which the device is set depends on the compression of the spring 22, this compression being determined by the position of the adjusting nut 22 on bushing 18. The body member 10 has an opening 58 to atmosphere so that movement of the diaphragm 14 is not resisted by air which would otherwise be imprisoned in the interior body member 10 and be compressed as the diaphragm 14 moves down.

What I claim is:

1. A motor-controlled valve assembly which comprises a housing containing a pair of diaphragms of different sizes, means for admitting a fluid under pressure into the housing between the diaphragms, a spring-pressed stem operatively connected to the diaphragms, a second housing, a valve and seat in said second housing, said valve and seat being in contact when the device is inoperative, and a spring-pressed stem connected to said valve and in position to be moved by said first stem, the spring acting on the stem connected to said diaphragms being stronger than the spring acting on the stem connected to said valve.

2. A motor-controlled valve assembly which comprises a housing containing a pair of diaphragms of different sizes, means for admitting a fluid under pressure into the housing between the diaphragms, a stem operatively connected to said diaphragms, a spring tending to move said stem in one direction, a second housing, a valve and seat in said second housing, said valve and seat being in contact when the device is inoperative, a stem connected to said valve and in position to be moved by said first stem, and a spring acting on said valve stem and tending to move said stem in a direction opposite to that in which said first stem is moved by its spring, the spring acting on the stem connected to the diaphragms being stronger than the spring acting on the valve stem.

3. A motor-controlled valve assembly which comprises a housing containing a pair of diaphragms of different sizes and having a single port through the wall thereof, means for admitting a fluid under pressure into the housing between the diaphragms through said port, a stem operatively connected to the diaphragms, a second housing, a valve and seat in said second housing, a stem connected to said valve and in position to be actuated by said diaphragm stem, and springs acting on said stems and tending to force them in opposite directions, the spring acting on the diaphragm stem being stronger than the spring acting on the valve stem and said valve being normally closed.

4. A motor-controlled valve assembly which comprises a housing containing a pair of diaphragms of different sizes, means for admitting a fluid under pressure into the housing between the diaphragms, a spring-pressed stem operatively connected to said diaphragms, a second housing, a pair of diaphragms of different sizes within said second housing, a spring-pressed stem in said second housing operatively connected to said diaphragms and in position to be actuated by said first stem, a valve in said second housing connected to the stem therein and cooperating with a seat, a passage through said second housing controlled by said valve, and a connection from the passage at one side of the valve to the interior of the second housing at one side of the larger diaphragm therein.

5. A motor-controlled valve assembly which comprises a housing containing a pair of diaphragms of different sizes, means for admitting a fluid under pressure into the housing between the diaphragms, a spring-pressed stem operatively connected to said diaphragms, a second housing, a normally closed valve in said second housing biassed toward open position by a spring in said second housing, and means connected to said valve and operable by said stem to close said valve.

6. A motor-controlled valve assembly which comprises a housing containing a pair of diaphragms of different sizes, means for admitting a fluid under pressure into the housing between the diaphragms, a spring-pressed stem operatively connected to said diaphragms, a second housing open to the first housing, a pair of diaphragms of different size in said second housing, a passage in said second housing defined in part by the small diaphragm in said housing, a valve for controlling said passage, a stem connected to said valve and to the diaphragms in said second housing, said stem being movable by the stem in the first housing, and a connection between said passage at one side of said valve to the interior of the second housing at one side of the large diaphragm therein.

7. A motor-controlled valve assembly which comprises a housing containing a pair of diaphragms of different sizes, means for admitting a fluid under pressure into the housing between the diaphragms, a spring-pressed stem operatively connected to said diaphragms, a second housing open to the first housing, a pair of diaphragms of different size in said second housing, a chamber in said second housing defined in part by the large diaphragm therein and by a diaphragm in the first housing, a passage in the second housing defined in part by the small diaphragm in said housing, a valve controlling said passage, a stem connected to said valve and to the diaphragms in the second housing, said stem being movable by the stem in the first housing, and a connection between said passage at one side of said valve and the interior of said chamber.

8. A motor-controlled valve assembly which comprises a housing containing a pair of diaphragms of different sizes, means for admitting a fluid under pressure into the housing between the diaphragms, a spring-pressed stem operatively connected to said diaphragms, a second housing open to the first housing, a pair of diaphragms of different size in said second housing, a chamber in said second housing defined in part by the large diaphragm therein and by a diaphragm in the first housing, a passage in the second housing defined in part by the small diaphragm in said housing, a valve controlling said passage, a stem connected to said valve and to the diaphragms in the second housing, said stem being movable by the stem in the first housing, a pipe for admission of fluid under pressure to said passage at one side of said valve, a pipe for conducting fluid away from said passage, and a connection between said chamber and the passage at the outlet side of said valve.

9. A motor-controlled valve assembly which comprises a housing containing a pair of diaphragms of different sizes, a stem operatively connected to said diaphragms, a spring acting on said stem, means for adjusting the compression of said spring, a valve having an operating element movable by said stem, said valve being normally held closed by the action of said spring and means for admitting a fluid under pressure into the housing between said diaphragms to effect movement of said stem against the resistance of said spring to open said valve.

GREGORY A. PETROE.

CERTIFICATE OF CORRECTION.

Patent No. 2,026,704.   January 7, 1936.

GREGORY A. PETROE.

It is hereby certified that error appears in the printed specification of the above numbered patent requiring correction as follows: Page 3, first column, line 5-6, claim 3, strike out the words "and having a single port through the wall thereof" and insert the same after "sizes" and before the comma in line 20, claim 4; same page and column, line 8, claim 3, strike out the words "through said port" and insert the same after "diaphragms" and before the comma in line 22, claim 4; and that the said Letters Patent should be read with these corrections therein that the same may conform to the record of the case in the Patent Office.

Signed and sealed this 3rd day of March, A. D. 1936.

Leslie Frazer (Seal)   Acting Commissioner of Patents.